(12) United States Patent
Bowman

(10) Patent No.: US 6,796,078 B1
(45) Date of Patent: Sep. 28, 2004

(54) FISHING POLE HOLDER MOUNTING SYSTEM

(76) Inventor: Robert Bowman, 2419 Central Ave., S. El Monte, CA (US) 91733

( * ) Notice: Subject to any disclaimer, the term of this patent is extended or adjusted under 35 U.S.C. 154(b) by 0 days.

(21) Appl. No.: 10/700,955

(22) Filed: Oct. 31, 2003

(51) Int. Cl.$^7$ .............................................. A01K 97/10
(52) U.S. Cl. ........................ 43/21.2; 211/70.8; 248/512
(58) Field of Search .......................... 43/21.2; 211/70.8; 248/512, 513, 515, 520

(56) References Cited

U.S. PATENT DOCUMENTS

| | | | |
|---|---|---|---|
| 4,157,803 A | | 6/1979 | Mack |
| 4,388,774 A | * | 6/1983 | Thoemke ..................... 43/21.2 |
| 4,527,349 A | * | 7/1985 | Emory, Jr. .................... 43/21.2 |
| 4,869,195 A | * | 9/1989 | Eichfeld ...................... 114/364 |
| 4,901,469 A | * | 2/1990 | Murray ........................ 43/21.2 |
| 4,916,847 A | * | 4/1990 | Rusgo ......................... 43/19.2 |
| 5,435,093 A | * | 7/1995 | Minorics et al. ............. 43/19.2 |
| 5,461,817 A | * | 10/1995 | Flood .......................... 43/19.2 |
| 5,519,959 A | | 5/1996 | Cross |
| 5,564,670 A | | 10/1996 | Dysarz |
| 5,662,306 A | * | 9/1997 | Dysarz ........................ 248/514 |
| 5,673,507 A | * | 10/1997 | Stokes, Jr. ................... 43/21.2 |
| 6,289,627 B1 | * | 9/2001 | Gibbs et al. ................. 43/21.2 |
| 6,568,648 B1 | * | 5/2003 | Ray ............................ 248/538 |

* cited by examiner

Primary Examiner—Peter M. Poon
Assistant Examiner—David Parsley

(57) ABSTRACT

A fishing pole holder mounting system for permitting fishing pole holders to be mounted to a rear of a boat. The fishing pole holder mounting system includes a support member comprising a medial portion and a plurality of mounting portions. The medial portion is positioned between the mounting portions. The mounting portions of the support member are designed for being selectively coupled to the boat whereby the medial portion of the support member extends along the rear of the boat. The medial portion is designed for being selectively engaged by the fishing rod holders whereby the medial portion supports fishing rods placed in the fishing rod holders and allowing the fishing rods to extend outwardly from the rear of the boat. The medial portion is coupled to the mounting portions at an angle to allow the medial portion to be positioned above the rear of the boat.

12 Claims, 5 Drawing Sheets

US 6,796,078 B1

FISHING POLE HOLDER MOUNTING SYSTEM

BACKGROUND OF THE INVENTION

1. Field of the Invention

The present invention relates to fishing rod holders and more particularly pertains to a new fishing pole holder mounting system for permitting fishing pole holders to be mounted to a rear of a boat.

2. Description of the Prior Art

The use of fishing rod holders is known in the prior art. U.S. Pat. No. 4,157,803 describes a device for extending from one gunwale to the other gunwale and has a plurality of fishing rod holder for receiving fishing rods. Another type of fishing rod holder is U.S. Pat. No. 5,564,670 having a device that mounts to the top of a cleat and selectively receives items, such as a fishing pole. U.S. Pat. No. 5,519,959 has a mounting base that removably engages a cleat and receives a fishing pole.

While these devices fulfill their respective, particular objectives and requirements, the need remains for a system that has certain improved features that do not require permanent mounting to the boat.

SUMMARY OF THE INVENTION

The present invention meets the needs presented above by mounting portions and mounting members that are clamped around the cleats of the boat to secure the support member to the boat.

Still yet another object of the present invention is to provide a new fishing pole holder mounting system that permits usage of the cleats when the support member engages the cleats.

Even still another object of the present invention is to provide a new fishing pole holder mounting system that allows mounting of the support member to either vertically mounted cleats or horizontally mounted cleats.

To this end, the present invention generally comprises a support member comprising a medial portion and a plurality of mounting portions. The medial portion is positioned between the mounting portions. The mounting portions of the support member are designed for being selectively coupled to the boat whereby the medial portion of the support member extends along the rear of the boat. The medial portion is designed for being selectively engaged by the fishing rod holders whereby the medial portion supports fishing rods placed in the fishing rod holders and allowing the fishing rods to extend outwardly from the rear of the boat. The medial portion is coupled to the mounting portions at an angle to allow the medial portion to be positioned above the rear of the boat.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
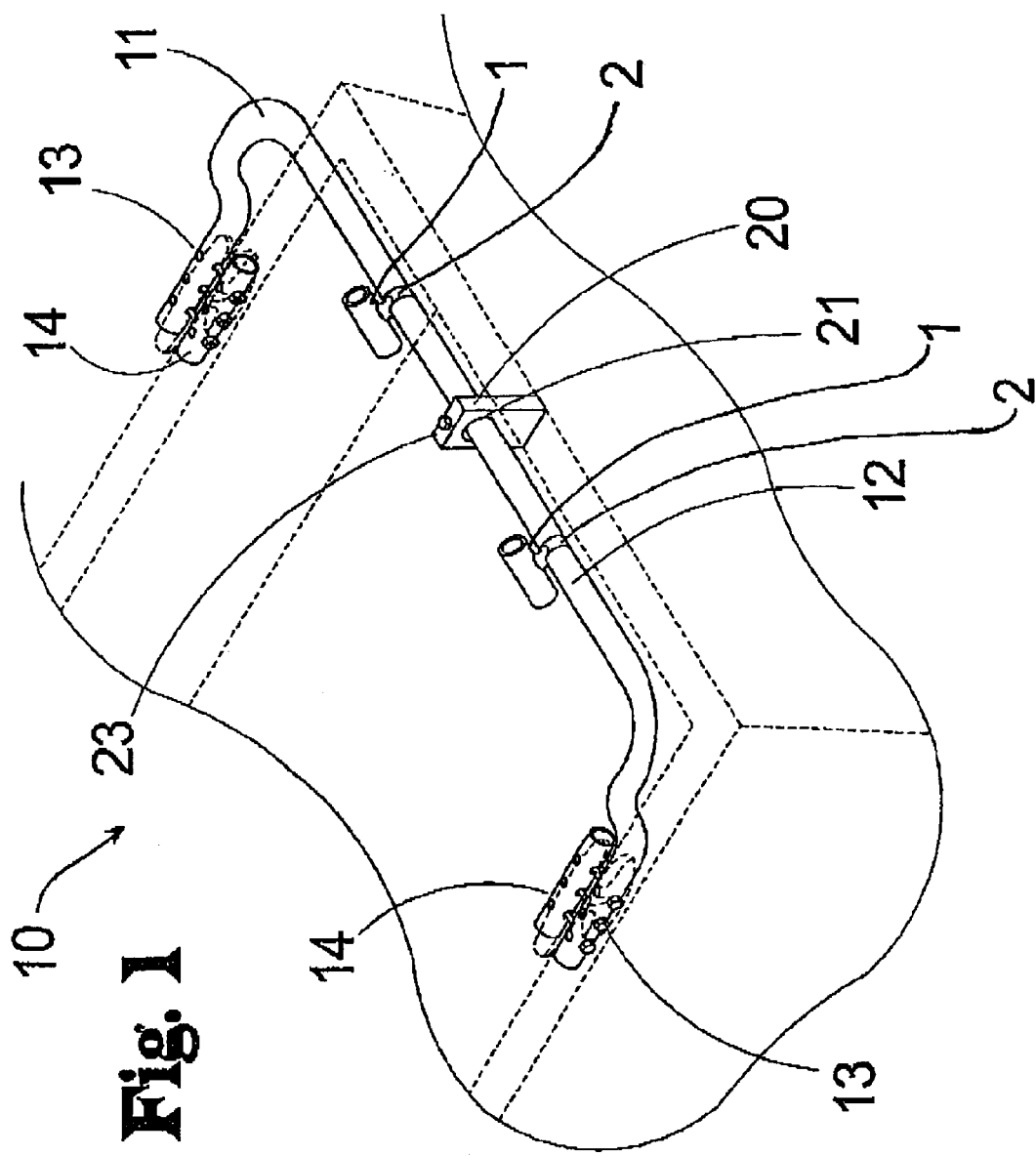
FIG. 1 is a perspective view of a new fishing pole holder mounting system according to the present invention.
Figure 2:
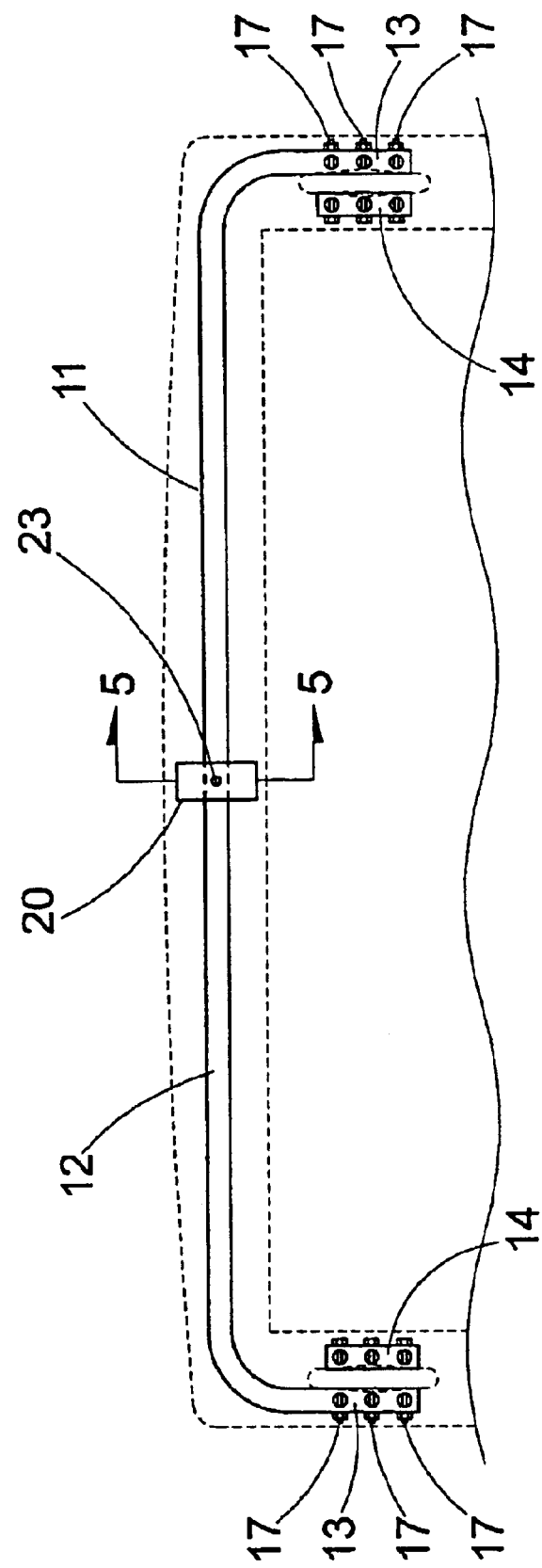
FIG. 2 is a top view of the present invention.
Figure 3:
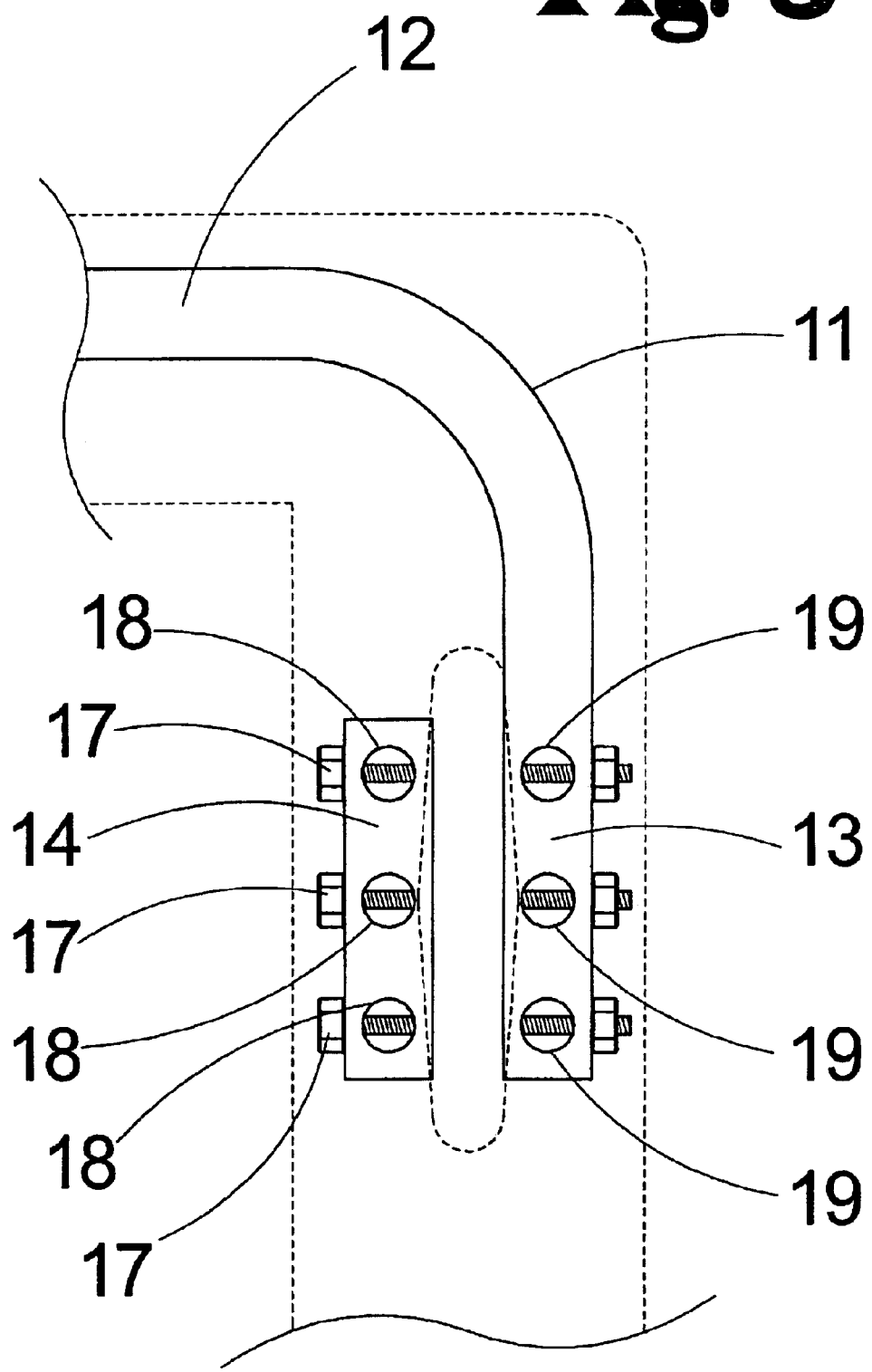
FIG. 3 is a top view of one of the mounting portions and one of the mounting members of the present invention mounted to a horizontal cleat.

With reference now to the drawings, and in particular to FIGS. 1 through 5 thereof, a new fishing pole holder mounting system embodying the principles and concepts of the present invention and generally designated by the reference numeral 10 will be described.

As best illustrated in FIGS. 1 through 5, the fishing pole holder mounting system 10 generally comprises a support member 11 comprising a medial portion 12 and a plurality of mounting portions 13. The medial portion 12 is positioned between the mounting portions 13. The mounting portions 13 of the support member 11 are designed for being selectively coupled to the boat whereby the medial portion 12 of the support member 11 extends along the rear of the boat. The medial portion 12 is designed for being selectively engaged by a securing means 2 of each of the fishing rod holders 1 whereby the medial portion 12 supports fishing rods placed in the fishing rod holders and allowing the fishing rods to extend outwardly from the rear of the boat. The medial portion 12 is coupled to the mounting portions 13 at an angle to allow the medial portion 12 to be positioned above the rear of the boat. The support member 11 is substantially U-shaped. The support member 11 is designed for substantially matching a perimeter of the rear of the hull of the boat.

Each of a pair of mounting members 14 is selectively coupled to one of the mounting portions 13 of the support member 11. The mounting members 14 are designed for being positioned adjacent one of the cleats of the boat whereby one of the mounting portions 13 is positioned opposite the associated one of the mounting members 14. Each of the mounting members 14 and the associated one of the mounting portions 13 is designed for clamping around the associated one of the cleats to mount the support member 11 to the boat when the mounting members 14 are coupled to the mounting portions 13 of the support member 11.

Each of the mounting members 14 comprises a plurality of horizontal bores 15 whereby the horizontal bores 15 extend through the associated one of the mounting members 14. Each of the mounting portions 13 of the support member 11 comprises a plurality of horizontal apertures 16 whereby the horizontal apertures 16 extend through the associated one of the mounting portions 13. The horizontal bores 15 of each of the mounting members 14 is aligned with the horizontal apertures 16 of the associated one of the mounting portion when the mounting members 14 and the mounting portions 13 are clamping the horizontally mounted cleats of the boat. Each of a plurality of fasteners 17 is selectively extended through one of the horizontal bores 15 and an aligned one of the horizontal apertures 16 whereby the fasteners 17 secure the mounting members 14 to the mounting portions 13 to clamp the cleats between the mounting members 14 and the mounting portions 13 of the support member 11 when the mounting members 14 and the mounting portions 13 are clamping the horizontally mounted cleats of the boat.

Figure 4:
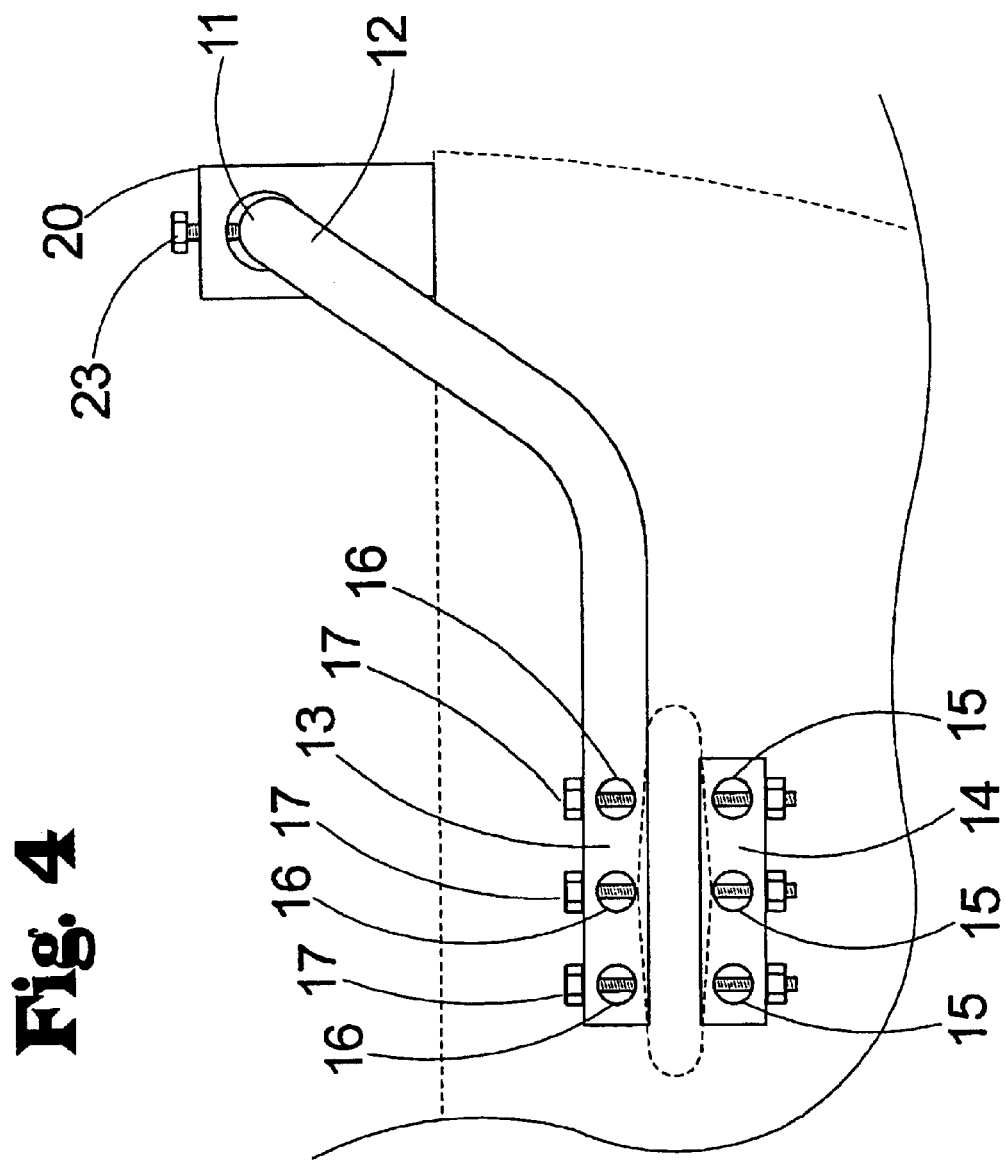
FIG. 4 is a side view of one of the mounting portions and one of the mounting members of the present invention mounted to a vertical cleat.
Figure 5:
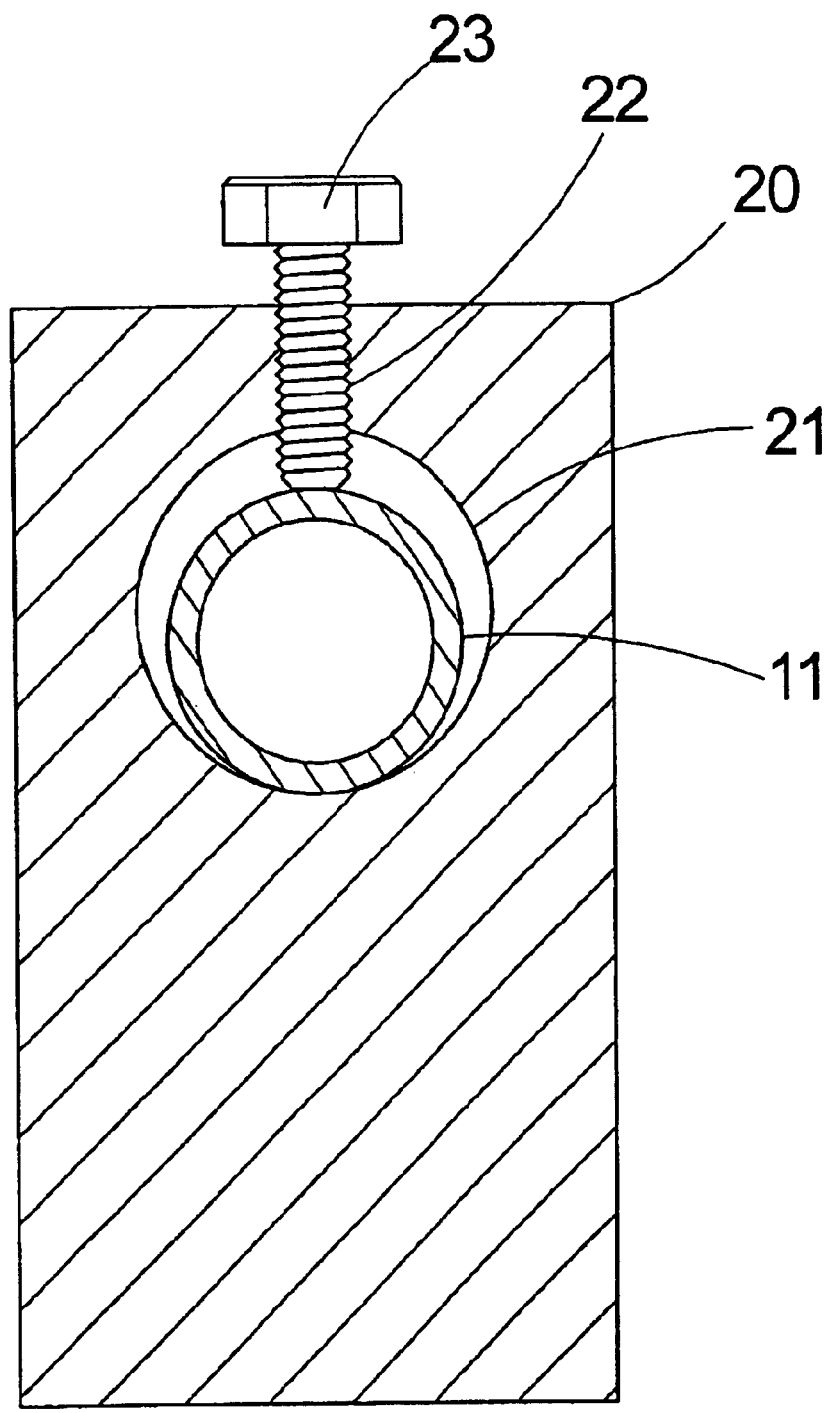
FIG. 5 is a cross-sectional view of the present invention taken along 5—5 of FIG. 2.

For the purpose of this specification vertically mounted cleats are defined as cleats being mounted to a substantially vertical surface of the boat, as shown in FIG. 4. Each of the mounting members 14 comprises a plurality of vertical bores 18 whereby the vertical bores 18 extend through the associated one of the mounting members 14. Each of the mounting portions 13 of the support member 11 comprises a plurality of vertical apertures 19 whereby the vertical apertures 19 extend through the associated one of the mounting portions 13. The vertical bores 18 of each of the mounting members 14 is aligned with the vertical apertures 19 of the associated one of the mounting portions 13 when the mounting members 14 and the mounting portions 13 are clamping the vertically mounted cleats of the boat. Each of the fasteners 17 is selectively extended through one of the vertical bores 18 and an aligned one of the vertical apertures 19 whereby the fasteners 17 secure the mounting members 14 to the mounting portions 13 to clamp the cleats between the mounting members 14 and the mounting portions 13 of the support member 11 when the mounting members 14 and the mounting portions 13 are clamping the vertically mounted cleats of the boat.

A brace member 20 is selectively coupled to the medial portion 12 of the support member 11. The brace member 20 is designed for extending between the support member 11 and a hull of the boat whereby the brace member 20 is for inhibiting the support member 11 bending downward and striking the boat., The brace member 20 comprises a support aperture 21. The support aperture 21 extends through the brace member 20. The support aperture 21 is for receiving the support member 11 whereby the support member 11 extends through the brace member 20.

The brace member 20 comprises a set aperture 22. The set aperture 22 extends through the brace member 20 into the support aperture 21 of the brace member 20. The set aperture 22 of the brace member 20 threadably receives a set fastener 23 whereby the set fastener 23 selectively extends through the brace member 20 and into the support aperture 21. The set fastener 23 is for abutting against the support member 11 extending through the support aperture 21 of the brace member 20 to secure the support member 11 to the brace member 20 and inhibit sliding of the brace member 20 with respect to the support member 11.

In use, the user places the support member 11 through the support aperture 21 of the brace member 20 and the set fastener 23 is used to secure the brace member 20 to the support member 11. The mounting portions 13 of the support member 11 are place adjacent to the cleats at the rear of the boat. Each of the mounting members 14 are then placed on the opposite sides of the cleats from the associated one of the mounting portions 13. The fasteners 17 are then extended through the mounting members 14 and the mounting portions 13 to clamp the cleats between the mounting members 14 and the mounting members 14. The user can then clamp a plurality of rod holders to the support member 11 and place a fishing rod in each of the rod holders while the user is fishing off the rear of the boat.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing pole holder mounting system for permitting fishing rod holders to be positioned adjacent a rear of a boat, the fishing pole holder mounting system comprising:

a support member comprising a medial portion and a plurality of mounting portions, said medial portion being positioned between said mounting portions, said mounting portions of said support member being adapted for being selectively coupled to the boat such that said medial portion of said support member extends along the rear of the boat, said medial portion being adapted for being selectively engaged by the fishing rod holders such that said medial portion supports fishing rods placed in the fishing rod holders and allowing the fishing rods to extend outwardly from the rear of the boat, said medial portion being coupled to said mounting portions at an angle to allow said medial portion to be positioned above the rear of the boat;

each of a pair of mounting members being selectively coupled to one of said mounting portions of said support member, said mounting members being adapted for being positioned adjacent a first side of one of a plurality of cleats of the boat such that one of said mounting portions is positioned adjacent a second side of the associated one of the cleats with the second side bring positioned opposite the first side of the associated one of the cleats, each of said mounting members and the associated one of the mounting portions being adapted for clamping around the associated one of the cleats to mount said support member to the boat when said mounting members are coupled to said mounting portions of said support member and are positioned adjacent their respective first and second sides of the cleats; and each of said mounting members comprising a plurality of horizontal bores such that said horizontal bores extend through the associated one of said mounting members, each of said mounting portions of said support member comprising a plurality of horizontal apertures such that said horizontal apertures extend through the associated one of said mounting portions, said horizontal bores of each of said mounting members being aligned with said horizontal apertures of the associated one of said mounting portion when said mounting members and said mounting portions are clamping horizontally mounted cleats of the boat, each of a plurality of fasteners being selectively extended through one of said horizontal bores and an aligned one of said horizontal apertures such that said fasteners secure said mounting members to said mounting portions to clamp the cleats between said mounting members and said mounting portions of said support member when said mounting members and said mounting portions are clamping horizontally mounted cleats of the boat.

2. The fishing pole holder system as set forth in claim 1, further comprising:
each of said mounting members comprising a plurality of vertical bores such that said vertical bores extend through the associated one of said mounting members, each of said mounting portions of said support member comprising a plurality of vertical apertures such that said vertical apertures extend through the associated one of said mounting portions, said vertical bores of each of said mounting members being aligned with said vertical apertures of the associated one of said mounting portion when said mounting members and said mounting portions are clamping vertically mounted cleats of the boat, each of said fasteners being selectively extended through one of said vertical bores and an aligned one of said vertical apertures such that said fasteners secure said mounting members to said mounting portions to clamp the cleats between said mounting members and said mounting portions of said support member when said mounting members and said mounting portions are clamping vertically mounted cleats of the boat.

3. The fishing pole holder system as set forth in claim 1, further comprising:
a brace member being selectively coupled to said medial portion of said support member, said brace member being adapted for extending between said support member and a hull of the boat such that said brace member is for inhibiting said support member bending downward and striking the boat.

4. The fishing pole bolder system as set forth in claim 3, further comprising:
said brace member comprising a support aperture, said support aperture extending through said brace member, said support aperture being for receiving said support member such that said support member extends through said brace member.

5. The fishing pole holder system as set forth in claim 4, further comprising:
said brace member comprising a set aperture, said set aperture extending through said brace member into said support aperture of said brace member, said set aperture of said brace member threadably receiving a set fastener such that said set fastener selectively extends through said brace member and into said support aperture, said set fastener being for abutting against said support member extending through said support aperture of said brace member to secure said support member to said brace member and inhibit sliding of said brace member with respect to said support member.

6. The fishing pole holder system as set forth in claim 1, further comprising:
said support member being substantially U-shaped, said support member being adapted for substantially matching a perimeter of a rear of a hull of the boat.

7. A fishing pole holder mounting system for permitting fishing rod holders to be positioned adjacent a rear of a boat, the fishing pole holder mounting system comprising:
a support member comprising a medial portion and a plurality of mounting portions, said medial portion being positioned between said mounting portions, said mounting portions of said support member being adapted for being selectively coupled to the boat such that said medial portion of said support member extends along the rear of the boat, said medial portion being adapted for being selectively engaged by the fishing rod holders such that said medial portion supports fishing rods placed in the fishing rod holders and allowing the fishing rods to extend outwardly from the rear of the boat, said medial portion being coupled to said mounting portions at an angle to allow said medial portion to be positioned above the rear of the boat;
each of a pair of mounting members being selectively coupled to one of said mounting portions of said support member, said mounting members being adapted for being positioned adjacent a first side of one of a plurality of cleats of the boat such that one of said mounting portions is positioned adjacent a second side of the associated one of the cleats with the second side being positioned opposite the first side of the associated one of the cleats, each of said mounting members and the associated one of the mounting portions being adapted for clamping around the associated one of the cleats to mount said support member to the boat when said mounting members are coupled to said mounting portions of said support member and are positioned adjacent their respective first and second sides of the cleats;
each of said mounting members comprising a plurality of horizontal bores such that said horizontal bores extend through the associated one of said mounting members, each of said mounting portions of said support member comprising a plurality of horizontal apertures such that said horizontal apertures extend through the associated one of said mounting portions, said horizontal bores of each of said mounting members being aligned with said horizontal apertures of the associated one of said mounting portion when said mounting members and said mounting portions are clamping horizontally mounted cleats of the boat, each of a plurality of fasteners being selectively extended through one of said horizontal bores and an aligned one of said horizontal apertures such that said fasteners secure said mounting members to said mounting portions to clamp the cleats between said mounting members and said mounting portions of said support member when said mounting members and said mounting portions are clamping the horizontally mounted cleats of the boat;
each of said mounting members comprising a plurality of vertical bores such that said vertical bores extend through the associated one of said mounting members, each of said mounting portions of said support member comprising a plurality of vertical apertures such that said vertical apertures extend through the associated one of said mounting portions, said vertical bores of each of said mounting members being aligned with said vertical apertures of the associated one of said mounting portion when said mounting members and said mounting portions are clamping vertically mounted cleats of the boat, each of said fasteners being selectively extended through one of said vertical bores and an aligned one of said vertical apertures such that said fasteners secure said mounting members to said mounting portions to clamp the cleats between said mounting members and said mounting portions of said support member when said mounting members and said mounting portions are clamping the vertically mounted cleats of the boat;
a brace member being selectively coupled to said medial portion of said support member, said brace member being adapted for extending between said support member and a hull of the boat such that said brace member is for inhibiting said support member bending downward and striking the boat;

said brace member comprising a support aperture, said support aperture extending through said brace member, said support aperture being for receiving said support member such that said support member extends through said brace member;

said brace member comprising a set aperture, said set aperture extending through said brace member into said support aperture of said brace member, said set aperture of said brace member threadably receiving a set fastener such that said set fastener selectively extends through said brace member and into said support aperture, said set fastener being for abutting against said support member extending through said support aperture of said brace member to secure said support member to said brace member and inhibit sliding of said brace member with respect to said support member; and said support member being substantially U-shaped, said support member being adapted for substantially matching a perimeter of the rear of the hull of the boat.

8. A fishing pole holder mounting system for permitting fishing rod holders to be positioned adjacent a rear of a boat, the fishing pole holder mounting system comprising:

a support member comprising a medial portion and a plurality of mounting portions, said medial portion being positioned between said mounting portions, said mounting portions of said support member being adapted for being selectively coupled to the boat such that said medial portion of said support member extends along the rear of the boat, said medial portion being adapted for being selectively engaged by the fishing rod holders such that said medial portion supports fishing rods placed in the fishing rod holders and allowing the fishing rods to extend outwardly from the rear of the boat, said medial portion being coupled to said mounting portions at an angle to allow said medial portion to be positioned above the rear of the boat;

each of a pair of mounting members being selectively coupled to one of said mounting portions of said support member, said mounting members being adapted for being positioned adjacent a first side of one of a plurality of cleats of the boat such that one of said mounting portions is positioned adjacent a second side of the associated one of the cleats with the second side being positioned opposite the first side of the associated one of the cleats, each of said mounting members and the associated one of the mounting portions being adapted for clamping around the associated one of the cleats to mount said support member to the boat when said mounting members are coupled to said mounting portions of said support member and are positioned adjacent their respective first and second sides of the cleats; and each of said mounting members comprising a plurality of vertical bores such that said vertical bores extend through the associated one of said mounting members, each of said mounting portions of said support member comprising a plurality of vertical apertures such that said vertical apertures extend through the associated one of said mounting portions, said vertical bores of each of said mounting members being aligned with said vertical apertures of the associated one of said mounting portion when said mounting members and said mounting portions are clamping vertically mounted cleats of the boat, each of a plurality of fasteners being selectively extended through one of said vertical bores and an aligned one of said vertical apertures such that said fasteners secure said mounting members to said mounting portions to clamp the cleats between said mounting members and said mounting portions of said support member when said mounting members and said mounting portions are clamping vertically mounted cleats of the boat.

9. The fishing pole holder system as set forth in claim 7, further comprising:

a brace member being selectively coupled to said medial portion of said support member, said brace member being adapted for extending between said support member and a hull of the boat such that said brace member is for inhibiting said support member bending downward and striking the boat.

10. The fishing pole holder system as set forth in claim 9, further comprising:

said brace member comprising a support aperture, said support aperture extending through said brace member, said support aperture being for receiving said support member such that said support member extends through said brace member.

11. The fishing pole holder system as set forth in claim 10, further comprising:

said brace member comprising a set aperture, said set aperture extending through said brace member into said support aperture of said brace member, said set aperture of said brace member threadably receiving a set fastener such that said set fastener selectively extends through said brace member and into said support aperture, said set fastener being for abutting against said support member extending through said support aperture of said brace member to secure said support member to said brace member and inhibit sliding of said brace member with respect to said support member.

12. The fishing pole holder system as set forth in claim 8, further comprising:

said support member being substantially U-shaped, said support member being adapted for substantially matching a perimeter of a rear of a hull of the boat.

* * * * *